June 2, 1964
E. O. UHRIG
3,135,902
SIMPLIFIED MULTIPLE SPEED SERVO SYSTEM
Filed Jan. 31, 1962
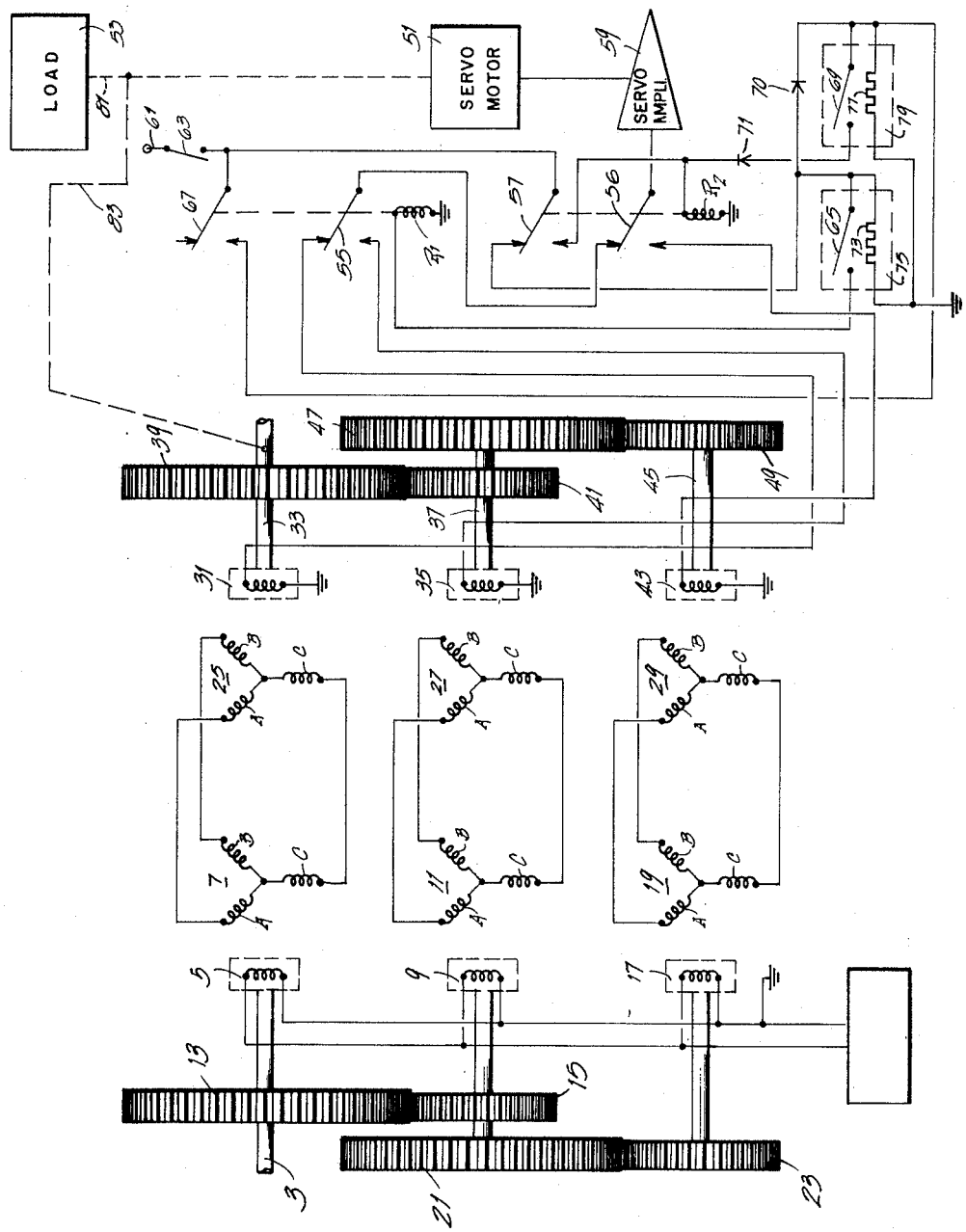
INVENTOR.
BY EDWARD O. UHRIG
ATTORNEY 3,135,902
SIMPLIFIED MULTIPLE SPEED SERVO SYSTEM
Edward O. Uhrig, Catonsville, Md., assignor, by mesne assignments, to the United States of America as represented by the Secretary of the Navy
Filed Jan. 31, 1962, Ser. No. 170,294
1 Claim. (Cl. 318—30)

The present invention relates to a servo drive system and more particularly to a novel and improved multiple speed servo drive system.

Fine-coarse error signal servo systems are often used to provide combined accuracy and speed where the servo motor and the load are to follow angular movement of the input shaft. Although numerous multiple speed servo systems have been devised for this purpose in the past, considerable difficulty has been experienced heretofore in providing a system which is relatively simple in design and yet reliable in use.

It is therefore a principal object of the present invention to provide a novel and improved servo system which eliminates the design complexity of prior systems.

It is a further object of the present invention to provide a novel and improved multiple speed servo system in which switching from coarse to fine or vernier control is effected after predetermined time intervals.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the present invention.

A preferred embodiment of the present invention is illustrated in the drawing. As shown therein, the servo input signal from a suitable navigation system or the like is provided in the form of angular movement of the shaft 3. Shaft 3 is directly coupled to the rotor 5 of the transmitter 7 in the coarse error signal circuit. Shaft 3 is also coupled to the rotor 9 of the transmitter 11 in the intermediate error signal circuit through gears 13 and 15. The gear train which includes gears 13 and 15 preferably drives rotor 9 in a ratio of 36:1 with respect to the input shaft 3 and rotor 5 of the coarse transmitter. Shaft 3 is also coupled to the rotor 17 of the transmitter 19 in the fine error signal circuit through gears 13, 15, 21 and 23. The gear train which includes gears 13, 15, 21 and 23 preferably drives rotor 17 in a ratio of 360:1 with respect to the input shaft 3 and rotor 5 of the coarse transmitter. The stator windings A, B and C of transmitters 7, 11 and 19 are electrically connected as shown to the stator windings A, B and C of signal receivers 25, 27 and 29. The rotor 31 of receiver 25 is positioned as shown on shaft 33. The rotor 35 of receiver 27 is positioned on shaft 37 which is directly coupled to shaft 33 through gears 39 and 41. The rotor 43 of receiver 29 is positioned on shaft 45 which is directly coupled to shaft 33 through gears 39, 41, 47 and 49. The gear train which includes gears 39 and 41 drives rotor 35 in the preselected ratio of 36:1 with respect to the shaft 33 and rotor 31. The gear train which includes gears 39, 41, 47 and 49 drives rotor 43 in the ratio of 360:1 with respect to the shaft 33 and rotor 31. The ungrounded terminal of the winding on rotor 31 is connected to the servo motor 51 and the load 53 through a circuit that includes the deenergized armature 55 of relay $R_1$, deenergized armature 56 of relay $R_2$ and the servo amplifier 59. The ungrounded terminal of the winding on rotor 35 is connected to the servo motor 51 through a circuit that includes the energized armature 55 of relay $R_1$, the deenergized armature 56 of relay $R_2$ and the servo amplifier 59. The ungrounded terminal of the winding on rotor 43 is connected to the servo motor 51 through a circuit that includes the energized armature 56 of relay $R_2$ and the servo amplifier 59. Relay $R_1$ is energized by a circuit that extends from the positive 28 volt power supply line 61 through master switch 63, through the deenergized armature 57 of relay $R_2$, through the thirty second thermal switch 65 and through the relay to ground. Relay $R_2$ is energized by a circuit that extends from the power supply line 61 through the master switch 63, through the energized armature 67 of relay $R_1$, through the sixty second thermal switch 69, through the rectifier 71, and through the relay to ground. $R_2$ is also energized by a circuit that extends from the power supply line 61 through the master switch 63 through the deenergized armature 57 of relay $R_2$, through rectifier 70, through thermal switch 69, through rectifier 71 and through the relay to ground. The stick circuit for relay $R_2$ extends from the power supply line 61, through master switch 63, through the energized armature 57 of relay $R_2$ and through the relay itself to ground. The energizing circuit for the heating element 73 for the thirty second thermal unit 75 extends from the power supply line 61 through master switch 63 through the deenergized armature 57 of relay $R_2$ and through element 73 to ground. The energizing circuit for the heating element 77 for the sixty second thermal unit 79 extends from the power supply line 61, through the master switch 63, through the energized armature 67 of relay $R_1$ and through the element 77 to ground. Shaft 81 which extends between servo motor 51 and the load 53 is operatively connected to shaft 33 through suitable gearing and shafting or the like indicated generally at 83. This connection as will be more apparent hereinafter provides for nulling the control signal when the load 53 is aligned with the angular position of input shaft 3.

In operation when the master switch 63 is closed, the servo motor 51 will position the load in accordance with the signals developed by the coarse synchro circuit. Simultaneously, on closure of master switch 63 the heating elements 73 and 77 of the thirty and sixty second thermal units 75 and 79 are energized. Coarse positioning normally occurs within 15 to 20 seconds. At the end of a 30 second interval thermal switch 65 closes and relay $R_1$ is energized. This switches energization of servo motor 51 and the load 53 from rotor 31 of the coarse error signal circuit to rotor 35 of the intermediate error signal circuit. Energization of relay $R_1$ also provides an alternate energizing circuit for heating element 77 of the 60 second thermal unit 79 through armature 67 of relay $R_1$. Intermediate positioning normally occurs with another 15 to 20 seconds. At the end of the 60 second interval thermal switch 69 closes and relay $R_2$ is energized. This switches energization of servo motor 51 and the load 53 from rotor 35 of the intermediate error signal circuit to rotor 43 of the fine error signal circuit. Energization of relay $R_2$ also completes its stick circuit through armature 57 and deenergizes relay $R_1$ and heating elements 73 and 77 of thermal units 75 and 79. Relay $R_2$ then remains energized until master switch 63 is opened. In the meantime, heating elements 73 and 77 are deenergized so that they will return to the environmental temperature and be ready to recycle with a minimum of delay.

It is to be understood that the thirty and sixty second time intervals suggested for closure of the contacts of thermal units 75 and 79 hereinabove are illustrative only. Actual intervals for any given system would be determined by considering the maximum servo error and the slewing rate of the servo loop.

It is also to be understood that although the concept described herein is incorporated in a synchro system, it could be used in similar manner with resolver, induction potentiometer, torque type synchro or resistance potentiometer systems without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

In a multiple speed servo system wherein an input angular displacement is transmitted to an output device, means responsive to the input angular displacement for generating a coarse error signal; means responsive to the input angular displacement for generating an intermediate error signal; means responsive to the input angular displacement for generating a vernier error signal; means for initially connecting only the coarse signal generating means to the output device; a first and a second relay; a pair of thermally sensitive switches; means controlled by energization of one said switch after a preliminary interval for energizing the first relay; means effective when the first relay is energized for disconnecting the coarse signal generator means from the output device and for connecting the intermediate signal generating means to the output device; means controlled by the other said switch after a prolonged interval for energizing the second relay; a stick circuit for the second relay means for deenergizing the first relay when the second relay is energized; and means effective when the second relay is energized for disconnecting the intermediate signal generator means from the output device and for connecting the vernier signal generating means to the output device.

References Cited in the file of this patent

UNITED STATES PATENTS

| | | |
|---|---|---|
| 2,453,815 | Rodemann | Nov. 16, 1948 |
| 2,515,495 | Curry | July 18, 1950 |
| 2,769,125 | Jacobi | Oct. 30, 1956 |